United States Patent
Sakayanagi et al.

(10) Patent No.: US 8,862,368 B2
(45) Date of Patent: Oct. 14, 2014

(54) CONTROL DEVICE FOR MULTI-CYLINDER INTERNAL COMBUSTION ENGINE EQUIPPED WITH VARIABLE COMPRESSION RATIO MECHANISM

(75) Inventors: Yoshihiro Sakayanagi, Mishima (JP); Satoru Watanabe, Susono (JP)

(73) Assignee: Toyota Jidosha Kabushiki Kaisha, Toyota-shi (JP)

( * ) Notice: Subject to any disclaimer, the term of this patent is extended or adjusted under 35 U.S.C. 154(b) by 403 days.

(21) Appl. No.: 13/399,314

(22) Filed: Feb. 17, 2012

(65) Prior Publication Data

US 2012/0215423 A1 Aug. 23, 2012

(30) Foreign Application Priority Data

Feb. 18, 2011 (JP) ................. 2011-033015

(51) Int. Cl.
- F02D 15/04 (2006.01)
- F02D 13/02 (2006.01)
- F02D 41/00 (2006.01)
- F02B 75/04 (2006.01)
- F02D 41/14 (2006.01)

(52) U.S. Cl.
CPC ........ *F02D 41/0085* (2013.01); *F02D 13/0238* (2013.01); *F02D 13/0269* (2013.01); *Y02T 10/142* (2013.01); *F02D 41/1454* (2013.01); *F02B 75/041* (2013.01); *F02D 15/04* (2013.01)
USPC .......................................... 701/104; 123/435

(58) Field of Classification Search
USPC ........ 701/101–105, 109; 123/27 R, 48, 48 B, 123/204, 212, 228, 241, 434, 435 R
See application file for complete search history.

(56) References Cited

U.S. PATENT DOCUMENTS

| | | | |
|---|---|---|---|
| 5,377,654 A * | 1/1995 | LoRusso et al. | 123/673 |
| 7,073,493 B2 | 7/2006 | Nakasaka et al. | |
| 7,159,547 B2 | 1/2007 | Nakasaka et al. | |
| 7,398,772 B2 | 7/2008 | Nakasaka et al. | |
| 8,655,572 B2 * | 2/2014 | Iwai et al. | 701/104 |
| 2003/0172908 A1 * | 9/2003 | Russell | 123/406.47 |

(Continued)

FOREIGN PATENT DOCUMENTS

| | | |
|---|---|---|
| JP | 10-184427 A | 7/1998 |
| JP | 2005-220925 A | 8/2005 |

(Continued)

*Primary Examiner* — John Kwon
*Assistant Examiner* — Johnny H Hoang
(74) *Attorney, Agent, or Firm* — Gifford, Krass, Sprinkle, Anderson & Citkowski, P.C.

(57) ABSTRACT

A control device for a multi-cylinder internal combustion engine that is equipped with a variable compression ratio mechanism includes an air-fuel ratio sensor, and a controller that determines whether or not actual mechanical compression ratios in cylinders of the internal combustion engine are uniform. The controller controls the variable compression ratio mechanism by decreasing a target mechanical compression ratio from a current first target mechanical compression ratio to a second target mechanical compression ratio without changing the amount of intake air and a fuel injection amount, and determines that the actual mechanical compression ratios in the cylinders are not uniform when the target mechanical compression ratio is set at the first target mechanical compression ratio if the differences in the output air-fuel ratios from the air-fuel ratio sensor for exhaust gases from the cylinders before and after the control of the variable compression ratio mechanism are not uniform.

3 Claims, 10 Drawing Sheets

(56) References Cited

U.S. PATENT DOCUMENTS

2005/0022797 A1* 2/2005 Ikemoto et al. ............... 123/673
2008/0078358 A1* 4/2008 Kumano et al. .......... 123/406.19
2010/0294245 A1* 11/2010 Yoshioka et al. ........... 123/48 R
2011/0265764 A1* 11/2011 Reiche et al. ................. 123/435

FOREIGN PATENT DOCUMENTS

| JP | 2008-151002 A | 7/2008 |
| JP | 2009-008016 A | 1/2009 |
| JP | 2009-221855 A | 10/2009 |

* cited by examiner

MECHANICAL COMPRESSION RATIO = COMBUSTION CHAMBER VOLUME + PISTON DISPLACEMENT/COMBUSTION CHAMBER VOLUME

ACTUAL COMPRESSION RATIO = COMBUSTION CHAMBER VOLUME + ACTUAL PISTON DISPLACEMENT/COMBUSTION CHAMBER VOLUME

EXPANSION RATIO = COMBUSTION CHAMBER VOLUME + PISTON DISPLACEMENT/COMBUSTION CHAMBER VOLUME

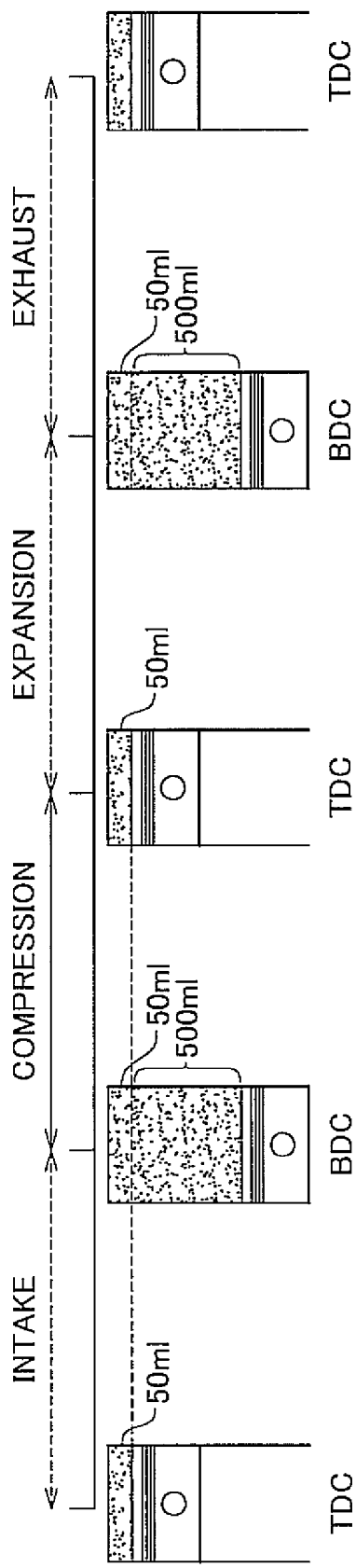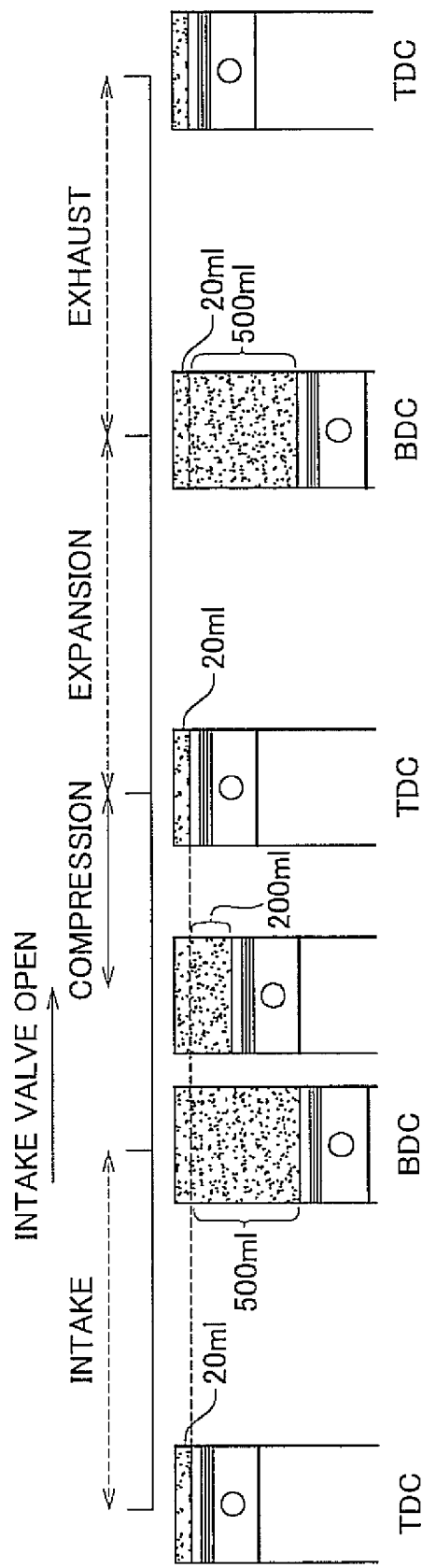

F I G . 10
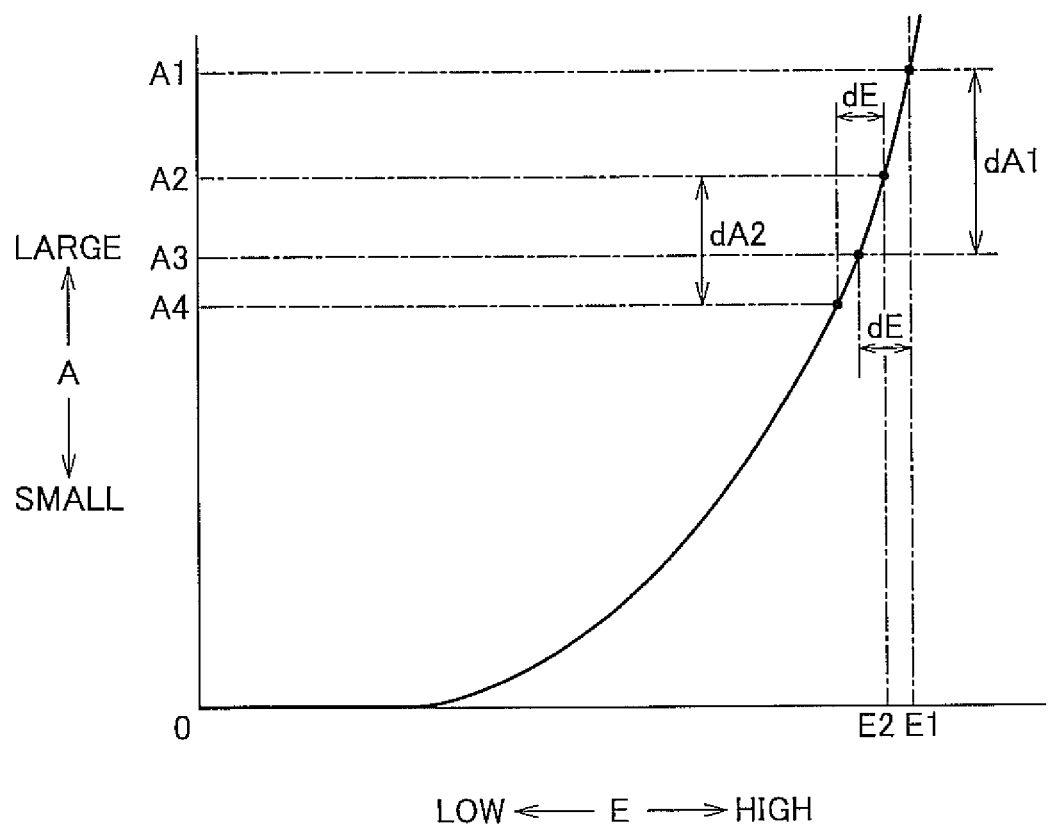

CONTROL DEVICE FOR MULTI-CYLINDER INTERNAL COMBUSTION ENGINE EQUIPPED WITH VARIABLE COMPRESSION RATIO MECHANISM

CROSS-REFERENCE TO RELATED APPLICATIONS

This application claims priority to Japanese Patent Application No. 2011-033015 filed on Feb. 18, 2011, which is incorporated herein by reference in its entirety including the specification, drawings and abstract.

BACKGROUND OF THE INVENTION

1. Field of the Invention

The present invention relates to a control device for a multi-cylinder internal combustion engine that is equipped with a variable compression ratio mechanism.

2. Description of Related Art

A multi-cylinder internal combustion engine that is equipped with a variable compression ratio mechanism which moves the cylinder block relative to the crankcase is known. In such an internal combustion engine, a target mechanical compression ratio is set based, for example, on the engine load to control the variable compression ratio mechanism so that a desired mechanical compression ratio ((combustion chamber volume at the compression top dead center+piston displacement)/combustion chamber volume) can be simultaneously achieved in all the cylinders.

However, even if the variable compression ratio mechanism is controlled as described above, the actual mechanical compression ratios in the cylinders may not be necessarily uniform and the power outputs from the cylinders cannot be uniform unless the combustion chamber volume at the compression top dead center is the same in all the cylinders. Thus, an idea for providing a building-up portion on the top of the piston or on an inner surface of the cylinder head of each of the cylinders and cutting the building-up portion in each of the cylinders in assembling the internal combustion engine so that the combustion chamber volume at the compression top dead center can be the same in all the cylinders when the variable compression ratio mechanism is controlled by a specific amount is proposed (refer to Japanese Patent Application Publication No. 2009-008016 (JP-A-2009-008016)).

Even if the combustion chamber volume at the compression top dead center is made uniform for all the cylinders as described above when the variable compression ratio mechanism is controlled by a specific amount, the actual combustion chamber volume at the compression top dead center may not be the same in all the cylinders and the actual mechanical compression ratios in the cylinders cannot be uniform if the cylinder block is slightly inclined and moved relative to the crankcase when the target mechanical compression ratio is changed to control the variable compression ratio mechanism, for example. Therefore, it is desired to determine whether or not the actual mechanical compression ratios in the cylinders are uniform so that measures can be taken if necessary.

SUMMARY OF THE INVENTION

The present invention provides a control device for a multi-cylinder internal combustion engine that is equipped with a variable compression ratio mechanism, which determines whether or not the actual mechanical compression ratios in the cylinders are uniform using an air-fuel ratio sensor that is disposed in an engine exhaust system without an additional sensor.

An aspect of the invention relates to a control device for a multi-cylinder internal combustion engine that is equipped with a variable compression ratio mechanism. The control device includes an air-fuel ratio sensor that is disposed in an engine exhaust system; and a controller that determines whether or not actual mechanical compression ratios in cylinders of the multi-cylinder internal combustion engine are uniform. The air-fuel ratio sensor outputs an air-fuel ratio that is higher than an actual air-fuel ratio when vaporized fuel is contained in exhaust gas. A deviation between the output air-fuel ratio from the air-fuel ratio sensor and the actual air-fuel ratio is greater as a concentration of the vaporized fuel in the exhaust gas is higher. The controller controls the variable compression ratio mechanism by decreasing a target mechanical compression ratio from a current first target mechanical compression ratio to a second target mechanical compression ratio without changing an amount of intake air and a fuel injection amount when the controller determines whether or not the actual mechanical compression ratios in the cylinders are uniform, and determines that the actual mechanical compression ratios in the cylinders are not uniform when the target mechanical compression ratio is set at the first target mechanical compression ratio if differences in the output air-fuel ratios from the air-fuel ratio sensor for the exhaust gases from the cylinders before and after the control of the variable compression ratio mechanism are not uniform.

The control device according to the above aspect includes the air-fuel ratio sensor that is disposed in the engine exhaust system, and the controller that determines whether or not the actual mechanical compression ratios in the cylinders of the multi-cylinder internal combustion engine are uniform. When vaporized fuel is contained in exhaust gas, the air-fuel ratio sensor outputs the air-fuel ratio that is higher than the actual air-fuel ratio because the air-fuel ratio sensor is unlikely to respond to such high-molecular-weight hydrocarbons. The deviation between the output air-fuel ratio from the air-fuel ratio sensor and the actual air-fuel ratio is greater as the concentration of the vaporized fuel in the exhaust gas is higher. As the mechanical compression ratio is higher, the combustion chamber volume at the compression top dead center decreases and the proportion of the quench area increases, and therefore, the amount of high-molecular-weight vaporized fuel, which has been simply vaporized and has not been burned in the cylinder, increases and the concentration of the vaporized fuel in the exhaust gas increases. Thus, the controller controls the variable compression ratio mechanism by decreasing the target mechanical compression ratio from the current first target mechanical compression ratio to the second target mechanical compression ratio without changing the amount of intake air and the fuel injection amount when the controller determines whether or not the actual mechanical compression ratios in the cylinders are uniform. Because the actual air-fuel ratio of the exhaust gas from each cylinder does not change, the difference in the output air-fuel ratio from the air-fuel ratio sensor for the exhaust gas from each cylinder before and after the control is equal to the difference in the deviation of the output air-fuel ratio. For example, when a value that is close to a minimum mechanical compression ratio is selected as the second target mechanical compression ratio to decrease the actual mechanical compression ratio in each cylinder sufficiently, the proportion of the quench area is significantly decreased, which means almost no vaporized fuel is contained in exhaust gas, and the deviation of the output air-fuel ratio becomes almost zero. In this case, the difference in the output air-fuel ratio from the air-fuel ratio sensor for the exhaust gas from each cylinder is exactly equal to the deviation of the output air-fuel ratio at the actual mechanical compression ratio in the cylinder at a time when the target mechanical compression ratio is set at the first target mechanical compression ratio. In this way, when the differences in the output air-fuel ratios from the air-fuel ratio sensor for the exhaust gases from the cylinders before and after the control of the variable compression ratio mechanism are not uniform, it is determined that the actual mechanical compression ratios in the cylinders are not uniform when the target mechanical compression ratio is set at the first target mechanical compression ratio.

In the above-described aspect, taking into account that the concentration of the vaporized fuel in the exhaust gas is higher as the actual mechanical compression ratio is higher, the deviation between the output air-fuel ratio from the air-fuel ratio sensor and the actual air-fuel ratio may be set at a different value for each actual mechanical compression ratio; the difference in the deviation of the output air-fuel ratio from the air-fuel ratio sensor before and after the mechanical compression ratio is decreased by a set amount may vary depending on the mechanical compression ratio before the decrease; the controller may control the variable compression ratio mechanism by decreasing the target mechanical compression ratio from the first target mechanical compression ratio to the second target mechanical compression ratio, which is smaller than the first target mechanical compression ratio by the set amount, when the controller determines whether or not the actual mechanical compression ratios in the cylinders are uniform; the controller may estimate the actual mechanical compression ratio in each of the cylinders at a time when the target mechanical compression ratio is set at the first target mechanical compression ratio, based on the difference in the output air-fuel ratio from the air-fuel ratio sensor for the exhaust gas from the cylinder before and after the control of the variable compression ratio mechanism; and when it is determined that the estimated actual mechanical compression ratios in the cylinders are not uniform, the controller may correct the output air-fuel ratio from the air-fuel ratio sensor for the exhaust gas from the cylinder, in which the estimated actual mechanical compression ratio is different from the first target mechanical compression ratio, at the time when the target mechanical compression ratio is set at the first target mechanical compression ratio, by subtracting the deviation at the actual mechanical compression ratio and adding the deviation at the first target mechanical compression ratio.

In the control device according to the above aspect, taking into account that the concentration of the vaporized fuel in the exhaust gas is higher as the actual mechanical compression ratio is higher, the deviation between the output air-fuel ratio from the air-fuel ratio sensor and the actual air-fuel ratio is set at a different value for each mechanical compression ratio. The difference in the deviation of the output air-fuel ratio from the air-fuel ratio sensor before and after the mechanical compression ratio is decreased by the set amount varies depending on the mechanical compression ratio before the decrease. Thus, the controller controls the variable compression ratio mechanism by decreasing the target mechanical compression ratio from the first target mechanical compression ratio to the second target mechanical compression ratio, which is smaller than the first target mechanical compression ratio by the set amount, when the controller determines whether or not the actual mechanical compression ratios in the cylinders are uniform, and the controller estimates the actual mechanical compression ratio in each of the cylinders at the time when the target mechanical compression ratio is set at the first target mechanical compression ratio, based on the difference in the output air-fuel ratio from the air-fuel ratio sensor for the exhaust gas from the cylinder before and after the control of the variable compression ratio mechanism. In this way, when it is determined that the actual mechanical compression ratios in the cylinders are not uniform, the controller corrects the output air-fuel ratio from the air-fuel ratio sensor for the exhaust gas from the cylinder, in which the estimated actual mechanical compression ratio is different from the first target mechanical compression ratio, at the time when the target mechanical compression ratio is set at the first target mechanical compression ratio, by subtracting the deviation at the actual mechanical compression ratio and adding the deviation at the first target mechanical compression ratio. The uncorrected output air-fuel ratios corresponding to respective cylinders cannot be compared because the uncorrected output air-fuel ratios include deviations corresponding to the actual mechanical compression ratios. However, by the correction, the output air-fuel ratio from the air-fuel ratio sensor for the exhaust gas from each cylinder at the time when the target mechanical compression ratio is set at the first target mechanical compression ratio is made equal to the output air-fuel ratio at the time when the first target mechanical compression ratio is achieved in the cylinder. Therefore, it can be determined whether or not the actual air-fuel ratios in the cylinders are uniform.

BRIEF DESCRIPTION OF THE DRAWINGS

Features, advantages, and technical and industrial significance of exemplary embodiments of the invention will be described below with reference to the accompanying drawings, in which like numerals denote like elements, and wherein:

FIGS. 8A and 8B are diagrams that are used to explain an ordinary cycle and a super-high expansion ratio cycle;

FIG. 10 is a graph that shows the relationship between the actual mechanical compression ratio and the deviation between the output air-fuel ratio from an air-fuel ratio sensor and the actual air-fuel ratio.

DETAILED DESCRIPTION OF EMBODIMENTS

Figure 1:
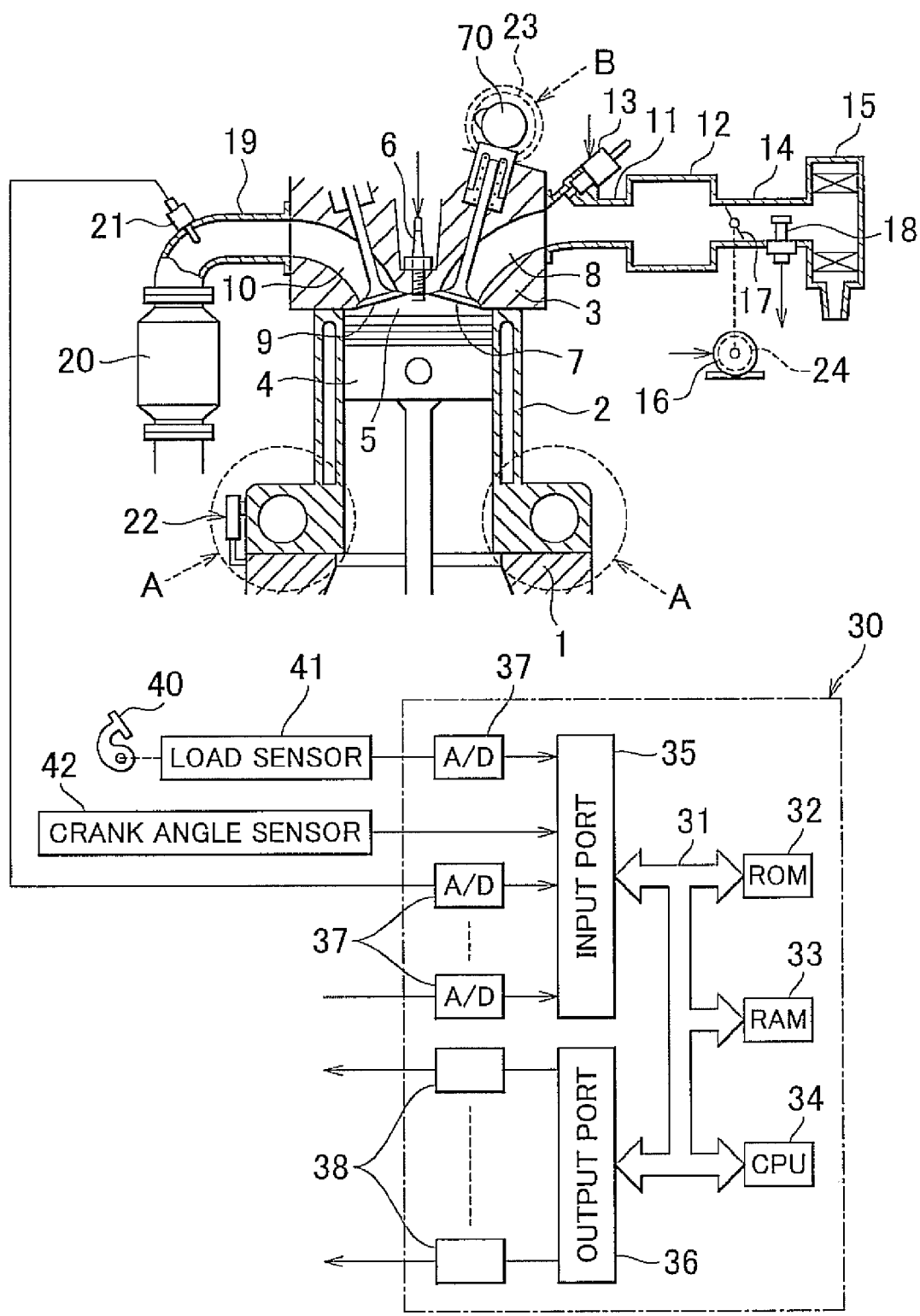
FIG. 1 is an overall view of an internal combustion engine.

FIG. 1 is a sectional side view of an internal combustion engine that is equipped with a variable compression ratio mechanism according to the present invention. Referring to FIG. 1, reference numeral 1 indicates a crankcase, reference numeral 2 indicates a cylinder block, reference numeral 3 indicates a cylinder head, reference numeral 4 indicates a piston, reference numeral 5 indicates a combustion chamber, reference numeral 6 indicates an ignition plug that is located at the center of the top of the combustion chamber 5, reference numeral 7 indicates an intake valve, reference numeral S indicates an intake port, reference numeral 9 indicates an exhaust valve, and reference numeral 10 indicates an exhaust port. The intake port 8 is coupled to a surge tank 12 via an intake branch pipe 11, and a fuel injection valve 13 that injects fuel into a corresponding intake port 8 is attached to each intake branch pipe 11. The fuel injection valve 13 may be placed in the combustion chamber 5 instead of being attached to the intake branch pipe 11.

The surge tank 12 is coupled to an air cleaner 15 via an intake duct 14, and a throttle valve 17 that is driven by an actuator 16 and an intake air amount detector 18 that uses a hot wire, for example, are located in the intake duct 14. The exhaust port 10 is coupled to a catalyst device 20, which contains, for example, a three-way catalyst, via an exhaust manifold 19, and an air-fuel ratio sensor 21 is located in the exhaust manifold 19.

In the embodiment that is shown in FIG. 1, a variable compression ratio mechanism A that is capable of varying the volume of the combustion chamber 5 when the piston 4 is at the compression top dead center by changing the relative positions of the crankcase 1 and the cylinder block 2 in the direction of axis of the cylinder is provided at the joint between the crankcase 1 and the cylinder block 2, and an actual compression action start timing change mechanism B that is capable of changing the timing of starting the actual compression action is also provided. In the embodiment that is shown in FIG. 1, the actual compression action start timing change mechanism B is constituted of a variable valve timing mechanism that is capable of controlling the timing of closing the intake valve 7.

As shown in FIG. 1, a relative position sensor 22 that detects the relative positional relation between the crankcase 1 and the cylinder block 2 is attached to the crankcase 1 and the cylinder block 2, and an output signal which indicates a change in the distance between the crankcase 1 and the cylinder block 2 is output from the relative position sensor 22. A valve timing sensor 23 that generates an output signal which indicates the timing of closing the intake valve 7 is attached to the variable valve timing mechanism 13, and a throttle opening sensor 24 that generates an output signal which indicates the degree of opening of the throttle valve is attached to the throttle valve driving actuator 16.

An electronic control unit 30 is constituted of a digital computer, and includes a ROM (read-only memory) 32, a RAM (random access memory) 33, a CPU (microprocessor) 34, an input port 35 and an output port 36, which are connected to each other via a bidirectional bus 31. The output signals from the intake air amount detector 18, the air-fuel ratio sensor 21, the relative position sensor 22, the valve timing sensor 23 and the throttle opening sensor 24 are input into the input port 35 via a corresponding AD converter 37. A load sensor 41 that generates an output voltage which is proportional to the amount of depression L of an accelerator pedal 40 is connected to the accelerator pedal 40, and the output voltage from the load sensor 41 is input into the input port 35 via a corresponding AD converter 37. In addition, a crank angle sensor 42 that generates an output pulse every time the crankshaft rotates, for example, by 30° is connected to the input port 35. The output port 36 is connected to the ignition plug 6, the fuel injection valve 13, the throttle valve driving actuator 16, the variable compression ratio mechanism A and the variable valve timing mechanism B via a corresponding drive circuit 38.

Figure 2:
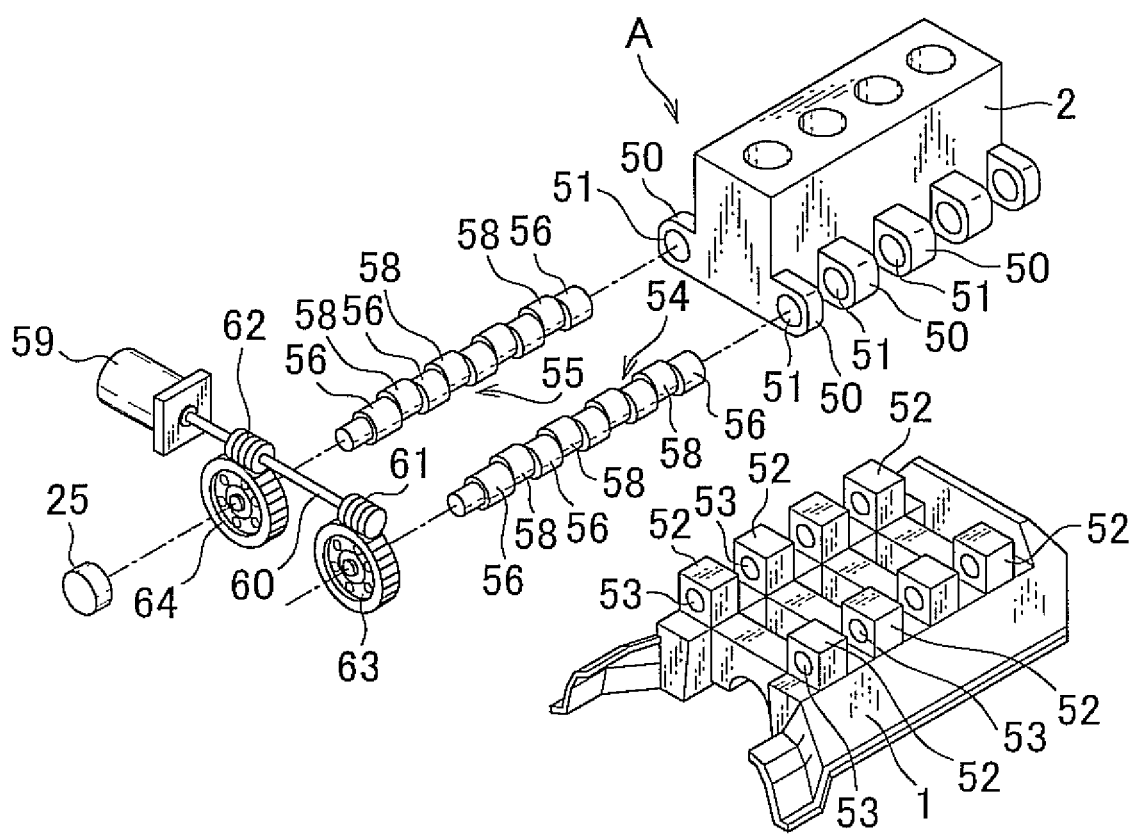
FIG. 2 is an exploded perspective view of a variable compression ratio mechanism.
Figure 3:
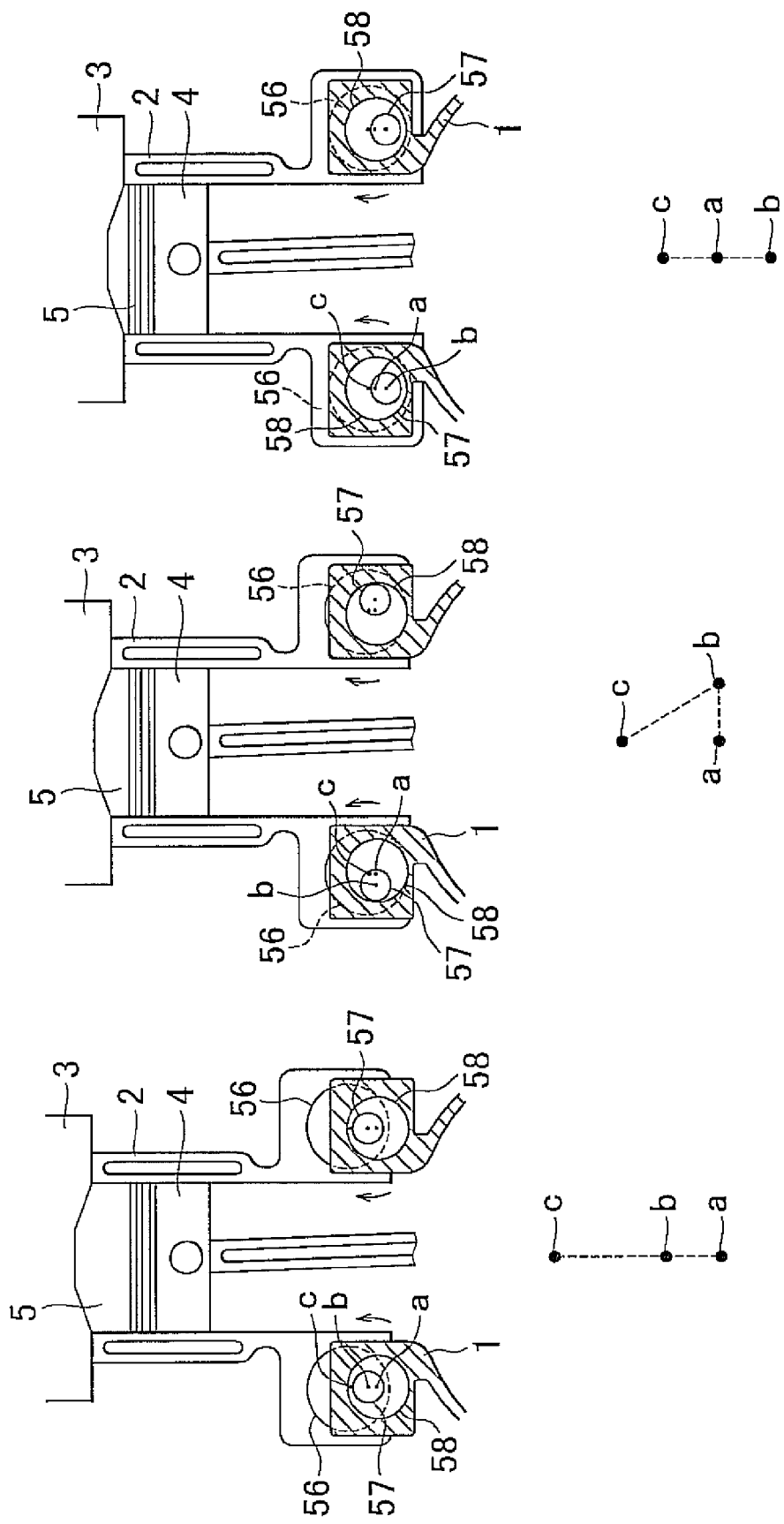
FIGS. 3A, 3B and 3C are sectional side views that schematically illustrate the internal combustion engine.

FIG. 2 is an exploded perspective view of the variable compression ratio mechanism A that is shown in FIG. 1, and each of FIGS. 3A, 3B, and 3C is a sectional side view that schematically illustrates the internal combustion engine. Referring to FIG. 2, a plurality of projections 50 are formed in a spaced relationship on lower parts of both sidewalls of the cylinder block 2, and each of the projections 50 has a cam insertion hole 51 with a circular cross-section. A plurality of projections 52, which are inserted between corresponding projections 50, are formed in a spaced relationship on the top surface of the crankcase 1, and each of the projections 52 also has a cam insertion hole 53 with a circular cross-section.

As shown in FIG. 2, paired camshafts 54 and 55 are provided, and circular cams 58, which are rotatably inserted into the cam insertion holes 53, are alternately secured to each of the camshafts 54 and 55. The circular cams 58 are coaxial with the axis of rotation of the camshaft 54 or 55. Eccentric shafts 57 that are eccentric with respect to the axes of rotation of the camshafts 54 and 55 extend on both sides of each of the circular cams 58 as shown in FIGS. 3A to 3C, and additional circular cams 56 are eccentrically and rotatably attached to the eccentric shafts 57. As shown in FIG. 2, the circular cams 56 are located on both sides of each of the circular cams 58, and the circular cams 56 are rotatably inserted in corresponding cam insertion holes 51. In addition, as shown in FIG. 2, a cam rotational angle sensor 25 that generates an output signal which indicates the rotational angle of the camshaft 55 is attached to the camshaft 55.

When the circular cams 58 fixed on the camshafts 54 and 55 are rotated, from the state that is shown in FIG. 3A, in the directions opposite to each other as indicated by the arrows in FIG. 3A, the eccentric shafts 57 are moved away from each other, causing the circular cams 56 to rotate in the cam insertion holes 51 in the direction opposite to the direction in which the circular cams 58 rotate. As a result, the eccentric shafts 57 are moved from their uppermost positions to their intermediate positions as shown in FIG. 3B. When the circular cams 58 are further rotated in the directions that are indicated by the arrows, the eccentric shafts 57 are moved to their lowermost positions as shown in FIG. 3C.

In each of FIG. 3A, FIG. 3B and FIG. 3C, the positional relation among the center a of the circular cam 58, the center b of the eccentric shaft 57 and the center c of the circular cam 56 in each state is also shown.

Comparison among FIG. 3A to FIG. 3C indicates that the relative positions of the crankcase 1 and the cylinder block 2 are determined by the distance between the center a of the circular cam 58 and the center c of the circular cam 56, and the cylinder block 2 is moved in the direction away from the crankcase 1 as the distance between the center a of the circular cam 58 and the center c of the circular cam 56 increases. In other words, the variable compression ratio mechanism A changes the relative positions of the crankcase 1 and the cylinder block 2 with a crank mechanism that uses rotary cams. When the cylinder block 2 is moved in the direction away from the crankcase 1, the volume of the combustion chamber 5 at a time when the piston 4 is at the compression top dead center increases. Therefore, the volume of the combustion chamber 5 at the time when the piston 4 is at the compression top dead center can be changed by rotating the camshafts 54 and 55.

Paired worms 61 and 62 which are threaded in the opposite directions are attached to a rotating shaft of a drive motor 59 as shown in FIG. 2 so that the camshafts 54 and 55 can be rotated in the directions opposite to each other, and worm wheels 63 and 64 that are meshed with the worms 61 and 62, respectively, are secured to ends of the camshafts 54 and 55, respectively. In this embodiment, the volume of the combustion chamber 5 at the time when the piston 4 is at the compression top dead center can be varied in a wide range by driving the drive motor 59.

Figure 4:
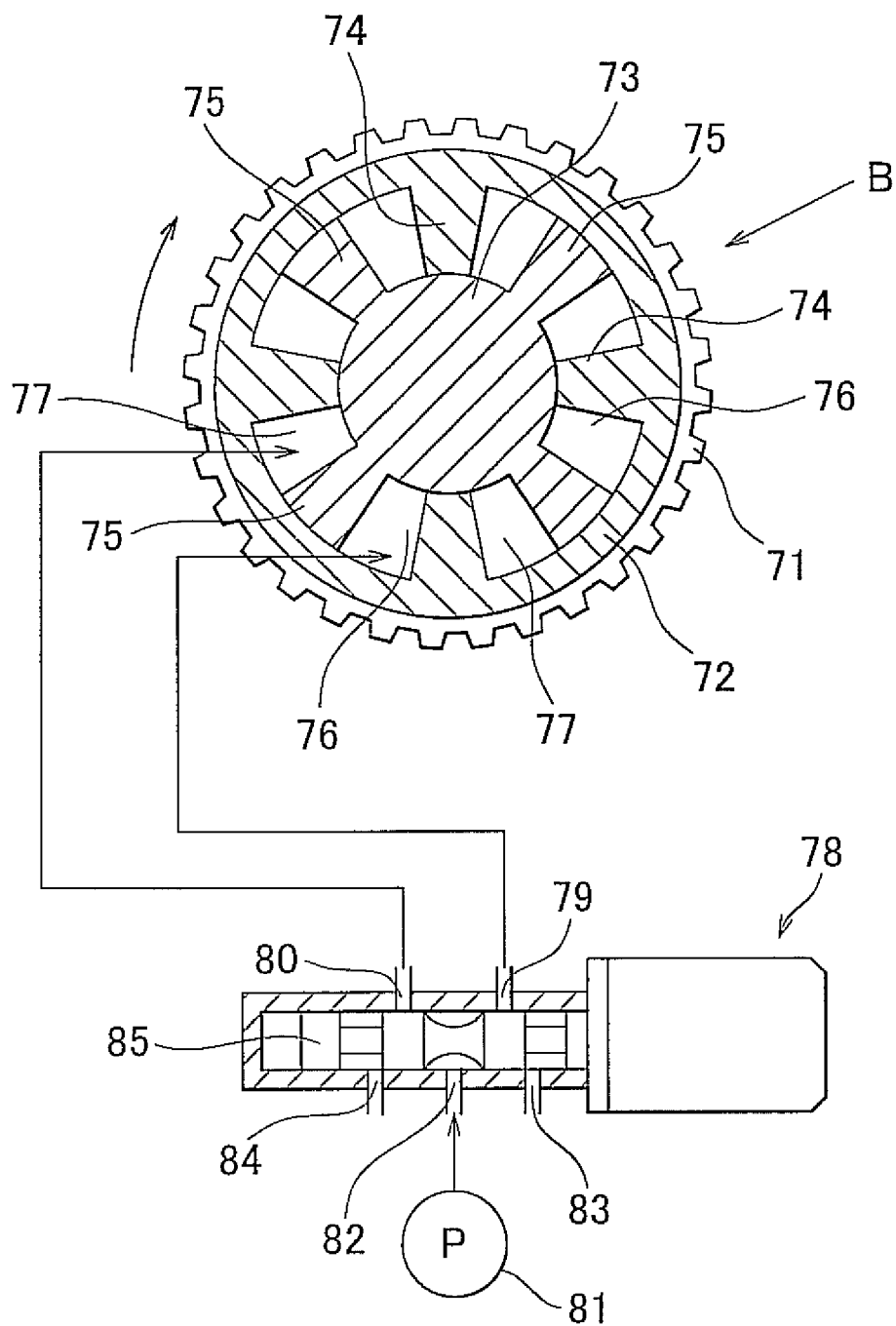
FIG. 4 is a diagram that illustrates a variable valve timing mechanism.

FIG. 4 shows the variable valve timing mechanism B, which is attached to an end of a camshaft (intake valve driving camshaft) 70 that drives the intake valve 7 which is shown in FIG. 1. Referring to FIG. 4, the variable valve timing mechanism B includes a timing pulley 71 that is rotated, in the direction of the arrow by the crankshaft of the engine via a timing belt, a cylindrical housing 72 that rotates together with the timing pulley 71, a rotating shaft 73 that rotates together with the intake valve driving camshaft 70 and is rotatable relative to the cylindrical housing 72, a plurality of partition walls 74 that extend from the inner peripheral surface of the cylindrical housing 72 to the outer peripheral surface of the rotating shaft 73, and vanes 75 that extend, between the partition walls 74, from the outer peripheral surface of the rotating shaft 73 to the inner peripheral surface of the cylindrical housing 72. An advancing hydraulic pressure chamber 76 and a retarding hydraulic pressure chamber 77 are formed on respective sides of each of the vanes 75.

The supply of hydraulic oil to each of the hydraulic pressure chambers 76 and 77 is controlled by a hydraulic oil supply control valve 78. The hydraulic oil supply control valve 78 includes hydraulic pressure ports 79 and 80 that are coupled to the hydraulic pressure chambers 76 and 77, respectively, a supply port 82 for hydraulic oil that is discharged from a hydraulic pressure pump 81, a pair of drain ports 83 and 84, a spool valve 85 that controls communication and interruption between the ports 79, 80, 82, 83 and 84.

When the phase of the cam of the intake valve driving camshaft 70 should be advanced, the spool valve 85 is moved rightward as viewed in FIG. 4, whereby the hydraulic oil that is supplied through the supply port 82 is supplied into the advancing hydraulic pressure chambers 76 through the hydraulic pressure port 79 and the hydraulic oil in the retarding hydraulic pressure chambers 77 is discharged through the drain port 84. At this time, the rotating shaft 73 is rotated in the direction of the arrow relative to the cylindrical housing 72.

On the other hand, when the phase of the cam of the intake valve driving camshaft 70 should be retarded, the spool valve 85 is moved leftward as viewed in FIG. 4, whereby the hydraulic oil that is supplied through the supply port 82 is supplied into the retarding hydraulic pressure chambers 77 through the hydraulic pressure port 80 and the hydraulic oil in the advancing hydraulic pressure chambers 76 is discharged through the drain port 83. At this time, the rotating shaft 73 is rotated in the opposite direction from the direction of the arrow relative to the cylindrical housing 72.

When the spool valve 85 is returned to the neutral position that is shown in FIG. 4 while the rotating shaft 73 is being rotated relative to the cylindrical housing 72, the relative rotating motion of the rotating shaft 73 is stopped and the rotating shaft 73 is held in the relative rotational position at that time. Thus, the phase of the cam of the intake valve driving camshaft 70 can be advanced or retarded by a desired amount by the variable valve timing mechanism B.

Figure 5:
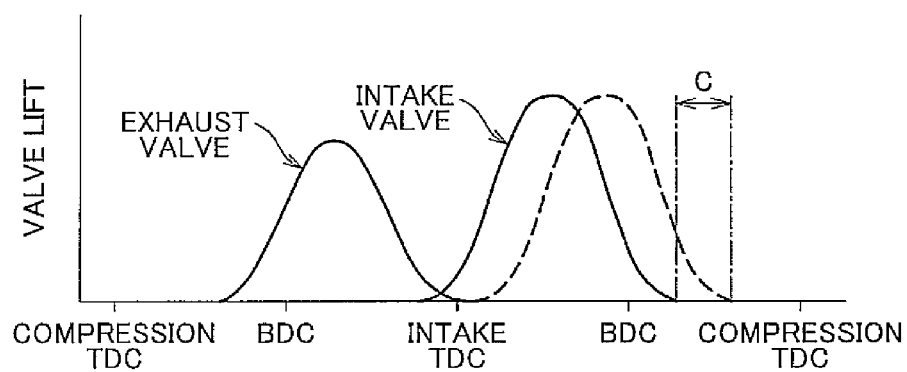
FIG. 5 is a chart that shows the valve lifts of an intake valve and an exhaust valve.

In FIG. 5, the solid line curve indicates the valve lift at a time when the phase of the cam of the intake valve driving camshaft 70 is advanced most by the variable valve timing mechanism B, and the broken line curve indicates the valve lift at a time when the phase of the cam of the intake valve driving camshaft 70 is retarded most: Thus, the opening time of the intake valve 7 can be arbitrarily set between the range that is indicated by the solid line curve and the range that is indicated by the broken line curve in FIG. 5, and, therefore, the timing of closing the intake valve 7 can be set at any crank angle in the range that is indicated by the arrow C in FIG. 5.

The variable valve timing mechanism B in FIG. 1 and FIG. 4 is shown for illustrative purposes, and various types of variable valve timing mechanism, such as a variable valve timing mechanism that can change only the timing of closing the intake valve without changing the timing of opening the intake valve, may be used.

Figure 6A:
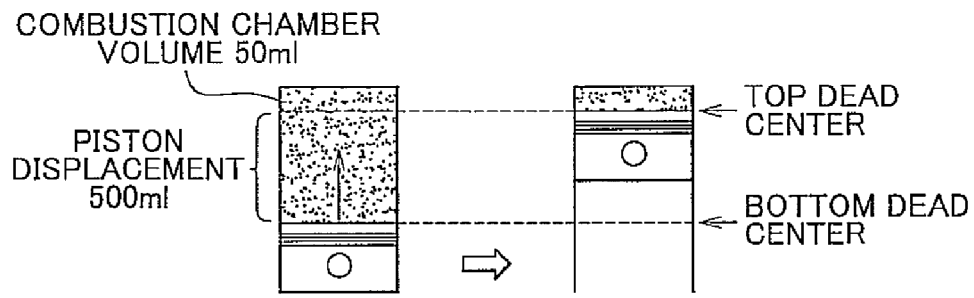
FIGS. 6A, 6B and 6C are diagrams that are used to explain the mechanical compression ratio, actual compression ratio and expansion ratio.
Figure 6B:
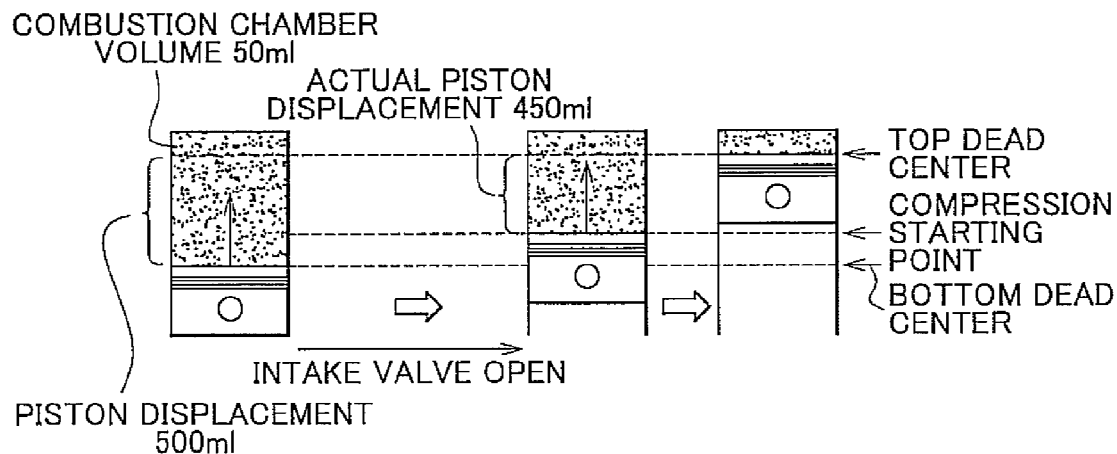
Figure 6C:
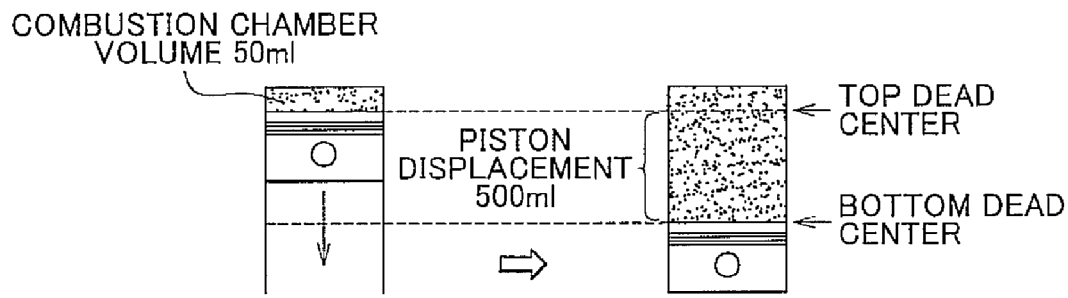

Referring next to FIGS. 6A to 6C, the meaning of the terms that are used herein are explained. It should be noted that an engine with a combustion chamber volume of 50 ml and a piston displacement of 500 ml is shown in FIGS. 6A, 6B and 6C for illustrative purposes. The term "combustion chamber volume" in FIGS. 6A, 6B and 6C means the volume of the combustion chamber at a time when the piston is at the compression top dead center.

FIG. 6A explains the term "mechanical compression ratio." The mechanical compression ratio is a value that is automatically determined only by the piston displacement during a compression stroke and the combustion chamber volume, and the mechanical compression ratio is expressed as follows: (combustion chamber volume+piston displacement)/combustion chamber volume. In the example that is shown in FIG. 6A, the mechanical compression ratio is (50 ml+500 ml)/50 ml=11.

FIG. 6B explains the term "actual compression ratio." The actual compression ratio is a value that is determined by the actual piston displacement from the point where a compression action is actually started to the point where the piston reaches the top dead center and the combustion chamber volume, and the actual compression ratio is expressed as follows: (combustion chamber volume+actual piston displacement)/combustion chamber volume. In other words, a compression action is not executed while the intake valve is open even if the piston has started to move up in a compression stroke as shown in FIG. 6B, and an actual compression action is started when the intake valve is closed. Thus, the actual compression ratio is expressed as above using the actual piston displacement. In the example that is shown in FIG. 6B, the actual compression ratio is (50 ml+450 ml)/50 ml=10.

FIG. 6C explains the term "expansion ratio." The expansion ratio is a value that is determined by the piston displacement during an expansion stroke and the combustion chamber volume, and the expansion ratio is expressed as follows: (combustion chamber volume+piston displacement)/combustion chamber volume. In the case that is shown in FIG. 6C, the expansion ratio is (50 ml+500 ml)/50 ml=11.

Figure 7:
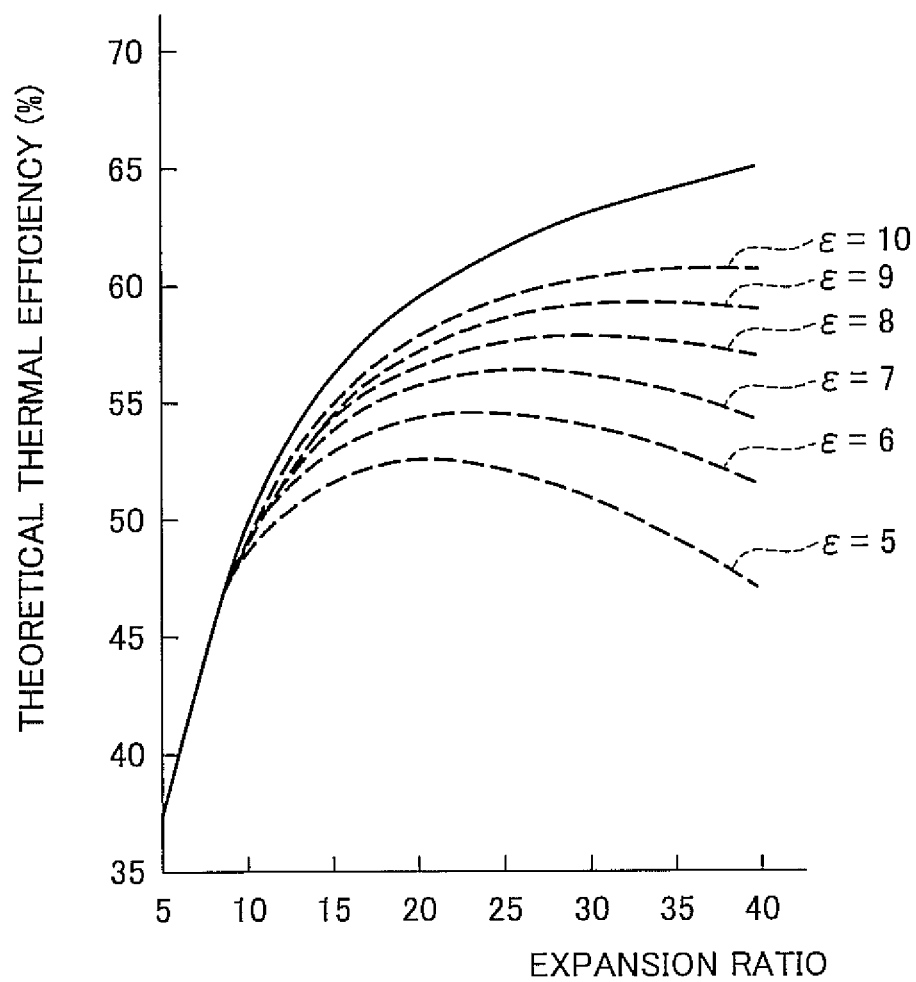
FIG. 7 is a chart that shows the relationship between the theoretical thermal efficiency and expansion ratio.

Referring next to FIG. 7 and FIGS. 8A and 8B, a super-high expansion ratio cycle that is used in the present invention is described. FIG. 7 shows the relationship between the theoretical thermal efficiency and the expansion ratio, and FIGS. 8A and 8B show a comparison between an ordinary cycle and the super-high expansion ratio cycle, which are selectively used depending on the load in the present invention.

FIG. 8A shows an ordinary cycle, in which the intake valve is closed when the piston is in the vicinity of the bottom dead center and a compression action by the piston is started when the piston is almost in the vicinity of the intake bottom dead center. In the example that is shown in FIG. 8A, the combustion chamber volume is 50 ml and the piston displacement is 500 ml as in the case of the example that is shown in FIGS. 6A, 6B and 6C. As can be understood from FIG. 8A, in the ordinary cycle, the mechanical compression ratio is (50 ml+500 ml)/50 ml=11, the actual compression ratio is almost 11, and the expansion ratio is (50 ml+500 ml)/50 ml=11. In other words, in an ordinary internal combustion engine, the mechanical compression ratio, the actual compression ratio and the expansion ratio all are approximately equal.

The solid line curve in FIG. 7 shows the change in theoretical thermal efficiency that is seen when the actual compression ratio and the expansion ratio are approximately equal to each other, in other words, in an ordinary cycle. The curve shows that the higher the expansion ratio, in other words, the higher the actual compression ratio, the higher the theoretical thermal efficiency. Thus, in order to improve the theoretical thermal efficiency in an ordinary cycle, it is necessary to increase the actual compression ratio. However, the actual compression ratio can only be increased up to approximately 12 because of the limitations caused by knocking during high-load engine operation. Therefore, the theoretical thermal efficiency cannot be increased sufficiently in an ordinary cycle.

Under these circumstances, studies have been made to improve the theoretical thermal efficiency with strict distinction between the mechanical compression ratio and the actual compression ratio, and it was, consequently, found that the theoretical thermal efficiency depends on the expansion ratio and the actual compression ratio has almost no effect on the theoretical thermal efficiency. In other words, because larger energy is required for compression to obtain a larger combustion force when the actual compression ratio is increased, the theoretical thermal efficiency hardly improves even if the actual compression ratio is increased.

On the contrary, when the expansion ratio is increased, the length of time for which a depressive force is applied to the piston during an expansion stroke increases, leading to an increase in length of time for which the piston produces torque on the crankshaft. Thus, as the expansion ratio is increased, the theoretical thermal efficiency is increased. The broken line curve with $\epsilon=10$ in FIG. 7 indicates the theoretical thermal efficiency when the expansion ratio is increased with the actual compression ratio fixed to 10. It can be understood that there is no significant difference between the increase in theoretical thermal efficiency that is achieved when the expansion ratio is increased with the actual compression ratio E kept low and the increase in theoretical thermal efficiency that is achieved when the actual compression ratio is increased together with the expansion ratio as indicated by the solid line curve in FIG. 7.

Because knocking does not occur when the actual compression ratio is kept low as described above, knocking can be prevented and the theoretical thermal efficiency can be significantly improved when the expansion ratio is increased with the actual compression ratio kept low. FIG. 8B illustrates an example in which the expansion ratio is increased with the actual compression ratio is kept low using the variable compression ratio mechanism A and the variable valve timing mechanism B.

Referring to FIG. 8B, the combustion chamber volume is decreased from 50 ml to 20 ml by the variable compression ratio mechanism A in this example. On the other hand, the timing of closing the intake valve is delayed by the variable valve timing mechanism B until the actual piston displacement is decreased from 500 ml to 200 ml. As a result, the actual compression ratio becomes (20 ml+200 ml)/20 ml=11 and the expansion ratio becomes (20 ml+500 ml)/20 ml=26 in this example. Therefore, only the expansion ratio is increased to 26 in the case that is shown in FIG. 8B as compared to the ordinary cycle that is shown in FIG. 8A, in which the actual compression ratio is approximately 11 and the expansion ratio is 11. This is the reason for the term "super-high expansion ratio cycle."

In general, in an internal combustion engine, the lower the engine load, the worse the thermal efficiency. Thus, in order to improve the thermal efficiency in engine operation, in other words, in order to improve the fuel efficiency, it is necessary to improve the thermal efficiency when the engine load is low. In the super-high expansion ratio cycle that is shown in FIG. 8B, however, the amount of intake air that can be taken into the combustion chamber 5 is smaller because the actual piston displacement during a compression stroke is decreased. This means that the super-high expansion ratio cycle can be adopted only when the engine load is relatively low. Thus, in the present invention, the super-high expansion ratio cycle that is shown in FIG. 8B is adopted when the engine load is relatively low and an ordinary cycle as shown in FIG. 8A is adopted when the engine is operated under high load conditions.

Figure 9:
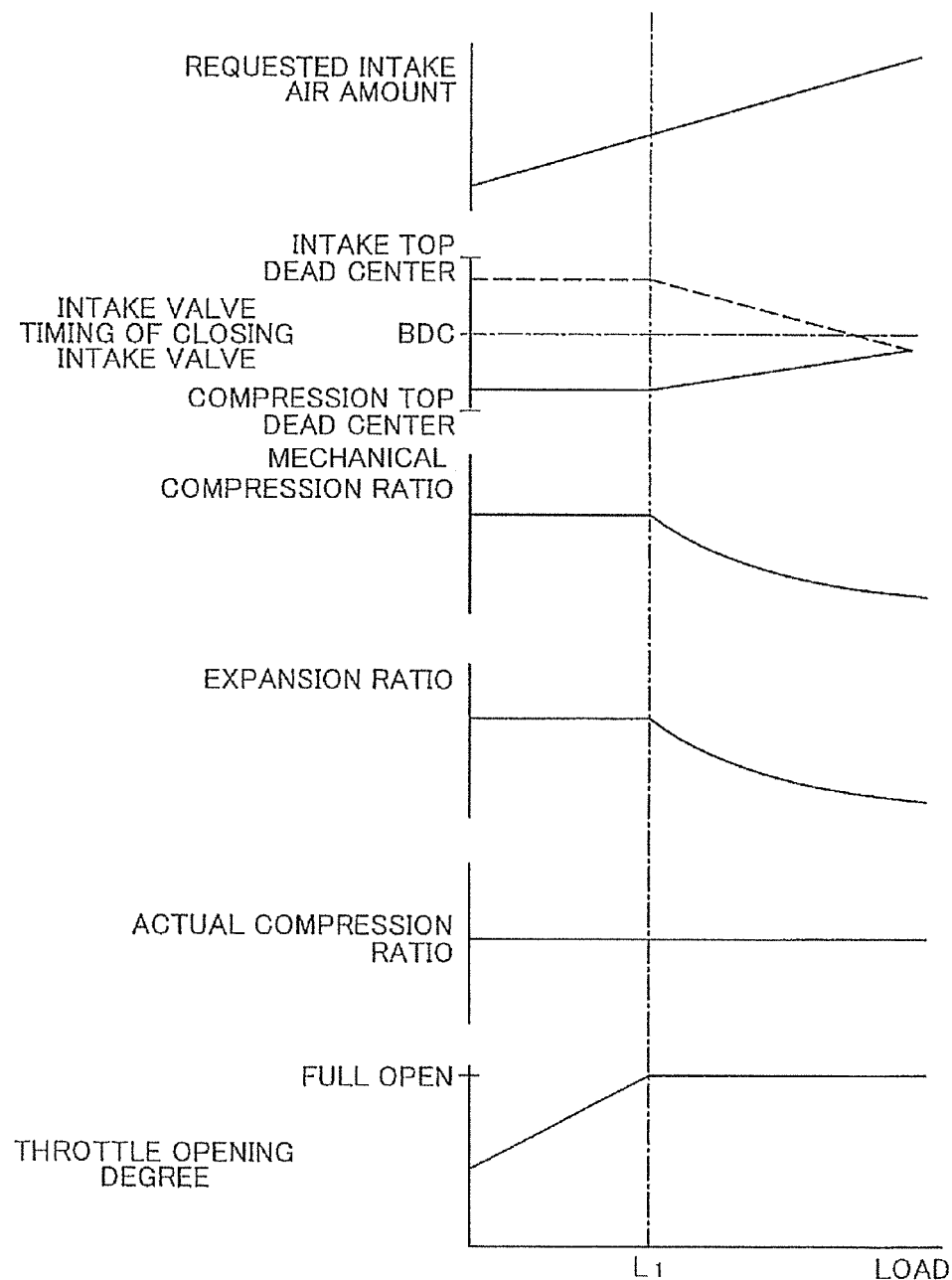
FIG. 9 is a chart that shows the change in the mechanical compression ratio and so on relative to the engine load.

Referring next to FIG. 9, the entire operation control is outlined. The changes in the amount of intake air, the timing of closing the intake valve, the mechanical compression ratio, the expansion ratio, the actual compression ratio and the degree of opening of the throttle valve 17 according to the engine load at a certain engine rotational speed are shown in FIG. 9. It should be noted that FIG. 9 shows a case in which the average air-fuel ratio in the combustion chamber 5 is controlled to the theoretical air-fuel ratio in a feedback manner based on an output signal from the air-fuel ratio sensor 21 so that the unburned HC, CO and $NO_X$ in the exhaust gas can be simultaneously reduced by the three-way catalyst in the catalyst device 20.

As described above, an ordinary cycle as shown in FIG. 8A is executed when the engine is operated under high load conditions. Thus, at this time, the expansion ratio is low as shown in FIG. 9 because the mechanical compression ratio is low, and the timing of closing the intake valve 7 that is shown by a solid line in FIG. 9 is advanced as indicated by the solid line curve in FIG. 5. In addition, in this case, the pumping loss is zero because the amount of intake air is large and because the throttle valve 17 is held in the fully open position.

When the engine load decreases, the timing of closing the intake valve 7 is delayed as indicated by a solid line in FIG. 9 in order to decrease the amount of intake air accordingly. At this time, the mechanical compression ratio is increased as the engine load decreases as shown in FIG. 9, in order to maintain the actual compression ratio substantially constant. Therefore, the expansion ratio also increases as the engine load decreases. Even in this state, the throttle valve 17 is held in the fully open position, and the amount of intake air that is supplied into the combustion chamber 5 is controlled not by the throttle valve 17 but by changing the timing of closing the intake valve 7.

As described above, when the engine load decreases from a high-load engine operating condition, the mechanical compression ratio is increased with the actual compression ratio maintained substantially constant as the amount of intake air decreases. In other words, the volume of the combustion chamber 5 at a time when the piston 4 is at the compression top dead center is decreased in proportion to the decrease in the amount of intake air. This means that the volume of the combustion chamber 5 at the time when the piston 4 is at the compression top dead center is changed in proportion to the amount of intake air. In the example that is shown in FIG. 9, because the air-fuel ratio in the combustion chamber 5 is equal to the theoretical air-fuel ratio, it can be said that the volume of the combustion chamber 5 at the time when the piston 4 is at the compression top dead center is changed in proportion to the amount of fuel.

When the engine load further decreases, the mechanical compression ratio is further increased. When the engine load decreases to an intermediate engine load L1, which is slightly on the low-load side, the mechanical compression ratio reaches a critical mechanical compression ratio as a limit which is determined by the structure of the combustion chamber 5 (maximum mechanical compression ratio). When the mechanical compression ratio has reached the critical mechanical compression ratio, the mechanical compression ratio is held at the critical mechanical compression ratio in the region in which the engine load is lower than the engine load L1 at which the mechanical compression ratio reached the critical mechanical compression ratio. Thus, the mechanical compression ratio is maximum and the expansion ratio is also maximum when the engine load is in an intermediate engine load region on the low load side and in a low engine load region, that is, when engine load is in a low engine load side region. In other words, when the engine load is in a low engine load side region, the mechanical compression ratio is maximized so that the maximum expansion ratio can be achieved.

In the embodiment that is shown in FIG. 9, when the engine load decreases to L1, the timing of closing the intake valve 7 reaches a critical closing point beyond which the amount of intake air that is supplied into the combustion chamber 5 cannot be controlled. When the timing of closing the intake valve 7 has reached the critical closing point, the timing of closing the intake valve 7 is maintained at the critical closing point in a region in which the engine load is lower than the engine load L1 at which the timing of closing the intake valve 7 reached the critical closing point.

When the timing of closing the intake valve 7 is maintained at the critical closing point, the amount of intake air cannot be controlled any more by changing the timing of closing the intake valve 7. In the embodiment that is shown in FIG. 9, in this state, in other words, in a region in which the engine load is lower than the engine load L1 at which the timing of closing the intake valve 7 reached the critical closing point, the amount of intake air that is supplied into the combustion chamber 5 is controlled by the throttle valve 17 and the opening of the throttle valve 17 is decreased as the engine load decreases.

On the other hand, the amount of intake air can be controlled, not by the throttle valve 17, but by advancing the timing of closing the intake valve 7 as the engine load decreases as indicated by a broken line in FIG. 9. Thus, in the embodiment of the present invention, when expressed to include both the case that is indicated by the solid line and the case that is indicated by the broken line in FIG. 9, the timing of closing the intake valve 7 is shifted away from the intake bottom dead center BDC until the critical closing point (the timing of closing at the engine load L1), beyond which the amount of intake air that is supplied into the combustion chamber cannot be controlled, is reached as the engine load decreases. As described above, the amount of intake air can be controlled by changing the timing of closing the intake valve 7 as indicated either by the solid line or by the broken line in FIG. 9.

As described above, an expansion ratio of 26 is achieved in the super-high expansion ratio cycle that is shown in FIG. 8B. A higher expansion ratio is preferred. However, as can be understood from FIG. 7, a considerably high theoretical thermal efficiency can be achieved if the expansion ratio is equal to or higher than 20 even for the practically usable minimum actual compression ratio $\epsilon=5$. Thus, in this embodiment, the variable compression ratio mechanism A is configured such that the expansion ratio can be equal to or higher than 20.

When the internal combustion engine that is equipped with the variable compression ratio mechanism A is a multi-cylinder internal combustion engine, such as a four-cylinder internal combustion engine, as shown in FIG. 2, if the cylinder block 2 is moved relative to the crankcase 1 in a slightly inclined manner, the combustion chamber volume at the compression top dead center cannot be the same in all the cylinders and the mechanical compression ratios in the cylinders cannot be uniform. In particular, when the mechanical compression ratio is high, a significant difference in mechanical compression ratio tends to occur among the cylinders because the combustion chamber volume itself at the compression top dead center is small. When the mechanical compression ratios in the cylinders are not uniform as described above, the power outputs from the cylinders may not be uniform, causing engine vibration. Therefore, it is desired to detect whether or not the actual mechanical compression ratios in the cylinders are uniform so that measures can be taken if necessary.

In the internal combustion engine of this embodiment, the air-fuel ratio sensor 21, which is located downstream of the exhaust gas merging region in the exhaust manifold 19, is used to determine whether the actual mechanical compression ratios in the cylinders are uniform. The air-fuel ratio sensor 21 is an ordinary air-fuel ratio sensor which outputs an air-fuel ratio based on the concentration of oxygen in the exhaust gas, and the output air-fuel ratio is higher as the concentration of oxygen is higher. Here, when the actual air-fuel ratio in the combustion chamber is constant and when unburned HC is contained in the exhaust gas, the concentration of oxygen in the exhaust gas is higher due to the unburned HC. However, because a catalyst that is supported on the air-fuel ratio sensor 21 causes the unburned HC to burn, the oxygen in the exhaust gas is consumed and the air-fuel ratio that is output from the air-fuel ratio sensor 21 will be constant.

The unburned HC, which has been reformed into lower molecular weight products in the combustion chamber, can be easily burned at the air-fuel ratio sensor 21, whereas the fuel that is simply vaporized in the quench area in the combustion chamber has a large molecular weight and is less likely to reach the catalyst that is supported on the air-fuel ratio sensor 21. Thus, the fuel tends to pass by the air-fuel ratio sensor 21 without being burned and the oxygen in the exhaust gas is not consumed. Thus, when vaporized fuel is contained in the exhaust gas, the air-fuel ratio sensor 21 outputs an air-fuel ratio which is higher than the actual air-fuel ratio and the deviation between the output air-fuel ratio from the air-fuel ratio sensor 21 and the actual air-fuel ratio is greater as the concentration of vaporized fuel in the exhaust gas is higher.

As the mechanical compression ratio E is higher, the combustion chamber volume at the compression top dead center decreases and the proportion of the quench area increases, and therefore, the amount of high-molecular-weight vaporized fuel, which has been simply vaporized and has not been burned in the cylinder, increases and the concentration of the vaporized fuel in the exhaust gas increases. Thus, a deviation A between the output air-fuel ratio from the air-fuel ratio sensor 21 and the actual air-fuel ratio can be preliminarily set for each mechanical compression ratio E as shown in FIG. 10. In other words, the current actual air-fuel ratio can be calculated by subtracting the deviation A corresponding to the current actual mechanical compression ratio E from the current output air-fuel ratio from the air-fuel ratio sensor 21.

The air-fuel ratio sensor 21 has the features as described above. Thus, in this embodiment, when the electronic control unit 30 determines whether or not the actual mechanical compression ratios in the cylinders are uniform, the electronic control unit 30 controls the variable compression ratio mechanism A by decreasing the target mechanical compression ratio from a current first target mechanical compression ratio to a second target mechanical compression ratio without changing the amount of intake air and the fuel injection amount.

The air-fuel ratio sensor 21 detects the air-fuel ratios of exhaust gas from each cylinder before and after the control of the variable compression ratio mechanism A. Specifically, the air-fuel ratio sensor 21 detects the air-fuel ratio while the exhaust gas that is discharged from each cylinder during an exhaust stroke in each cylinder is passing by the air-fuel ratio sensor 21. Here, let A/F(1)$b$, A/F(2)$b$, A/F(3)$b$ and A/F(4)$b$, respectively, stand for the output air-fuel ratios from the air-fuel ratio sensor 21 for exhaust gases from #1 cylinder, #2 cylinder, #3 cylinder and #4 cylinder at a time when the target mechanical compression ratio is set at a first target mechanical compression ratio, and let A/F(1)$a$, A/F(2)$a$, A/F(3)$a$ and A/F(4)$a$, respectively, stand for the output air-fuel ratios from the air-fuel ratio sensor 21 for the exhaust gases from #1 cylinder, #2 cylinder, #3 cylinder and #4 cylinder at a time when the target mechanical compression ratio is set at a second target mechanical compression ratio. Because the actual mechanical compression ratio in each cylinder at the time when the target mechanical compression ratio is set at the first target mechanical compression ratio is unknown, the actual air-fuel ratios of the exhaust gases may not be necessarily different even if A/F(1)$b$, A/F(2)$b$, A/F(3)$b$ and A/F(4)$b$ are all different, and the air-fuel ratios of the actual exhaust gases may not be necessarily the same even if A/F(1)$b$, A/F(2)$b$, A/F(3)$b$ and A/F(4)$b$ are all the same.

However, when the second target mechanical compression ratio is set to the minimum mechanical compression ratio or a mechanical compression ratio that is close thereto, the actual mechanical compression ratio in each cylinder also becomes equal to the minimum mechanical compression ratio or a mechanical compression ratio that is close thereto, whereby the combustion chamber volume at the compression top dead center increases and the proportion of the quench area becomes significantly small. As a result, in this case, because high-molecular-weight vaporized fuel, which has been simply vaporized and has not been burned in each cylinder, is hardly contained in the exhaust gas from the cylinder, the deviation A between the output air-fuel ratio from the air-fuel ratio sensor 21 and the actual air-fuel ratio becomes zero (0) as shown in FIG. 10.

Thus, preferably, the second target mechanical compression ratio is set to the minimum mechanical compression ratio (the mechanical compression ratio at a time when the cylinder block 2 is at its highest position) or a mechanical compression ratio that is close thereto. Then, the output air-fuel ratios A/F(1)$a$, A/F(2)$a$, A/F(3)$a$ and A/F(4) from the air-fuel ratio sensor 21 for the exhaust gases from the cylinders at a time when the target mechanical compression ratio is set at the second target mechanical compression ratio have no deviation, in other words, are equal to the actual air-fuel ratios. Because the amount of intake air and the fuel injection amount are not changed before and after the control of the variable compression ratio mechanism A, the actual air-fuel ratio in each cylinder does not change. Thus, when the differences A/F(1)$b$–A/F(1)$a$, A/F(2)$b$–A/F(2)$a$, A/F(3)$b$–A/F(3)$a$ and A/F(4)$b$–A/F(4)$a$ in the output air-fuel ratios from the air-fuel ratio sensor 21 for the exhaust gases from the cylinders are calculated, each of the calculated differences is exactly equal to the deviation of the output air-fuel ratio at the actual mechanical compression ratio in each cylinder at a time when the target mechanical compression ratio is set at the first target mechanical compression ratio.

For example, suppose that #1 cylinder has an actual mechanical compression ratio E1 when the target mechanical compression ratio is set at the first target mechanical compression ratio and the #2 cylinder has an actual mechanical compression ratio E2 when the target mechanical compression ratio is set at the first target mechanical compression ratio as shown in FIG. 10. The actual air-fuel ratio of the exhaust gas from the #1 cylinder is equal to the output air-fuel ratio A/F(1)$a$ from the air-fuel ratio sensor 21 at the time when the target mechanical compression ratio is set at the second target mechanical compression ratio (minimum mechanical compression ratio) and the actual air-fuel ratio of the exhaust gas from the #2 cylinder is equal to the output air-fuel ratio A/F(2)$b$ from the air-fuel ratio sensor 21 at the time when the target mechanical compression ratio is set at the second target mechanical compression ratio (minimum mechanical compression ratio). Thus, the difference between the output air-fuel ratio A/F(1)$b$ at the time when the target mechanical compression ratio is set at the first target mechanical compression ratio and the output air-fuel ratio A/F(1)$a$ at the time when the target mechanical compression ratio is set at the second target mechanical compression ratio in the #1 cylinder is A1 in FIG. 10, and the difference between the output air-fuel ratio A/F(2)$b$ at the time when the target mechanical compression ratio is set at the first target mechanical compression ratio and the output air-fuel ratio A/F(2)$a$ at the time when the target mechanical compression ratio is set at the second target mechanical compression ratio in the #2 cylinder is A2 in FIG. 10.

As shown in FIG. 10, the deviation A between the output air-fuel ratio from the air-fuel ratio sensor and the actual air-fuel ratio is different for each mechanical compression ratio (except for the case where the mechanical compression ratio E is close to the minimum mechanical compression ratio because the deviation A is constant at zero when the mechanical compression ratio E is close to the minimum mechanical compression ratio). Thus, if the differences in output air-fuel ratios from the air-fuel ratio sensor for exhaust gases from the cylinders before and after the control of the variable compression ratio mechanism A are uniform, it can be determined that the actual mechanical compression ratios in the cylinders are uniform when the target mechanical compression ratio is set at the first target mechanical compression ratio even if the output air-fuel ratios of the cylinders are not uniform. Thus, if the differences in output air-fuel ratios from the air-fuel ratio sensor for exhaust gases from the cylinders before and after the control of the variable compression ratio mechanism A are not uniform, it can be determined that the actual mechanical compression ratios in the cylinders are not uniform when the target mechanical compression ratio is set at the first target mechanical compression ratio even if the output air-fuel ratios of the cylinders are uniform.

In this way, in the case where the second target mechanical compression ratio is set to a value that is close to the minimum mechanical compression ratio, the output air-fuel ratio from the air-fuel ratio sensor 21 for exhaust gas from each cylinder becomes equal to the actual air-fuel ratio that is free from deviation when the variable compression ratio mechanism A is controlled by changing the target mechanical compression ratio to the second target mechanical compression ratio. It is, therefore, possible to determine whether or not the air-fuel ratio in each cylinder is abnormal or to compare the air-fuel ratios in the cylinders.

However, setting the second target mechanical compression ratio to a value that is close to the minimum mechanical compression ratio is not desirable from the viewpoint of engine operation because it causes a significant decrease in the actual mechanical compression ratio in each cylinder at the first target mechanical compression ratio which is requested based on the engine operating conditions, which leads to a decrease in efficiency. Therefore, a mechanical compression ratio which is smaller than the first target mechanical compression ratio by a relatively small set amount may be set as the second target mechanical compression ratio.

As shown in FIG. 10, the deviation A between the output air-fuel ratio from the air-fuel ratio sensor 21 and the actual air-fuel ratio is greater as the mechanical compression ratio E is higher. The difference dA in the deviation A, which is set for each mechanical compression ratio, before and after the mechanical compression ratio is decreased by a set amount dE varies depending on the mechanical compression ratio before the decrease. In other words, the deviation is A1 when the actual mechanical compression ratio is E1 and the deviation is A3 after the actual mechanical compression ratio E1 is slightly decreased by the set amount dE, and the difference dA1 in the deviation is A1−A3. On the other hand, the deviation is A2 when the actual mechanical compression ratio is E2 and the deviation is A4 after the actual mechanical compression ratio E2 is slightly decreased by the set amount dE, and the difference dA2 in the deviation is A2−A4. The difference dA1 and the difference dA2 are different from each other, and, as shown in FIG. 10, the differences dA in the deviation corresponding to different mechanical compression ratios, except the minimum mechanical compression ratio and values that are close to the minimum mechanical compression ratio, are different from each other. Therefore, a difference dA in the deviation corresponding to each mechanical compression ratio can be set.

Thus, when the electronic control unit 30 determines whether or not the actual mechanical compression ratios in the cylinders are uniform, the variable compression ratio mechanism is controlled by decreasing the target mechanical compression ratio from a first target mechanical compression ratio to a second target mechanical compression ratio which is smaller than the first target mechanical compression ratio by a set amount dE. Therefore, the actual mechanical compression ratio is decreased by the set amount dE in each cylinder. The difference dA in the output air-fuel ratio from the air-fuel ratio sensor 21 for exhaust gas from each cylinder before and after the control is calculated. The difference dA in each cylinder is equal to the difference in the deviation of the output air-fuel ratio from the air-fuel ratio sensor 21 for exhaust gas from the cylinder before and after the control of the variable compression ratio mechanism. The difference dA is a value corresponding to the actual mechanical compression ratio in the cylinder at the time when the target mechanical compression ratio is set at the first target mechanical compression ratio. Thus, the actual mechanical compression ratio in each cylinder at the time when the target mechanical compression ratio is set at the first target mechanical compression ratio can be estimated by calculating the difference dA corresponding to each cylinder.

When the deviations A in the output air-fuel ratio from the air-fuel ratio sensor 21 for actual mechanical compression ratios E as shown in FIG. 10 have been set as described above, the actual mechanical compression ratio in each cylinder at the time when the target mechanical compression ratio is set to the first target mechanical compression ratio can be estimated using a mechanical compression ratio which is smaller than the first target mechanical compression ratio by a set amount as the second target mechanical compression ratio without significantly decreasing the actual mechanical compression ratio in each cylinder at the first target mechanical compression ratio which is requested based on the engine operating conditions, and it can be determined whether or not the actual mechanical compression ratios in the cylinders are uniform when the target mechanical compression ratio is set at the first target mechanical compression ratio.

In addition, as for the cylinder in which the actual mechanical compression ratio is different from the first target mechanical compression ratio when the target mechanical compression ratio is set at the first target mechanical compression ratio, the output air-fuel ratio from the air-fuel ratio sensor for the exhaust gas from the cylinder at the time when the target mechanical compression ratio is set at the first target mechanical compression ratio is corrected by subtracting the deviation at the actual mechanical compression ratio and adding the deviation at the first target mechanical compression ratio. The uncorrected output air-fuel ratios corresponding to respective cylinders cannot be compared because the uncorrected output air-fuel ratios include deviations corresponding to the actual mechanical compression ratios. However, by the correction, the output air-fuel ratio from the air-fuel ratio sensor for exhaust gas from each cylinder at the time when the target mechanical compression ratio is set at the first target mechanical compression ratio is made equal to the output air-fuel ratio at the time when the first target mechanical compression ratio is achieved in the cylinder. Therefore, it can be determined whether or not the actual air-fuel ratios in the cylinders are uniform.

Specifically, for example, when the target mechanical compression ratio is set at the first target mechanical compression ratio E1 and when the actual mechanical compression ratios in the #2 cylinder, #3 cylinder and #4 cylinder are equal to the first target mechanical compression ratio E1 whereas the actual mechanical compression ratio in the #1 cylinder is E2 as shown in FIG. 10, the output air-fuel ratio A/F(1)b from the air-fuel ratio sensor 21 for the exhaust gas from the #1 cylinder is corrected by subtracting the deviation A2 at the actual mechanical compression ratio E2 and adding the deviation A1 at the first target mechanical compression ratio E1 (A/F(1)b−A2+A1).

When the target mechanical compression ratio is set at the first target mechanical compression ratio E1, the uncorrected output air-fuel ratio of the #1 cylinder has a different deviation because the actual mechanical compression ratio in the #1 cylinder is different from that in other cylinders and therefore cannot be compared to the output air-fuel ratios of other cylinders. However, by the correction, the output air-fuel ratio from the air-fuel ratio sensor for exhaust gas from each cylinder at the time when the target mechanical compression ratio is set at the first target mechanical compression ratio is made equal to the output air-fuel ratio at the time when the first target mechanical compression ratio is achieved in the cylinder. Therefore, it can be determined whether or not the actual air-fuel ratios in the cylinders are uniform.

It is also contemplated to increase the target mechanical compression ratio from a first target mechanical compression ratio to a third mechanical compression ratio in order to determine whether the mechanical compression ratios in the cylinders are uniform when the target mechanical compression ratio is set at the first target mechanical compression ratio. In this embodiment, however, it can be determined whether or not the actual mechanical compression ratios in the cylinders are uniform even when the first target mechanical compression ratio is set at the maximum mechanical compression ratio (the mechanical compression ratio at a time when the cylinder block 2 is at its lowest position) because the target mechanical compression ratio is decreased from the first target mechanical compression ratio to the second target mechanical compression ratio.

In the case where it is determined whether or not the actual mechanical compression ratios in the cylinders are uniform when the first target mechanical compression ratio is set at the maximum mechanical compression ratio, if the difference dA corresponding to at least one cylinder is greater than the difference in the deviation corresponding to the maximum mechanical compression ratio when the difference dA in the deviation corresponding to each cylinder (that is, the difference dA in the deviation of the output air-fuel ratio from the air-fuel ratio sensor for exhaust gas from each cylinder, in other words, the difference in the output air-fuel ratio from the air-fuel ratio sensor for exhaust gas from each cylinder) is calculated before and after the variable compression ratio mechanism A is controlled by setting the target mechanical compression ratio to the second target mechanical compression ratio which is smaller than the first target mechanical compression ratio by the set amount dE as described above, it can be determined that the air-fuel ratio sensor 21 is in an abnormal state because the deviation of the output air-fuel ratio from the air-fuel ratio sensor 21 at the maximum mechanical compression ratio is so large that there is a possibility that low-molecular weight HC cannot be sufficiently burned, for example.

While the air-fuel ratio sensor 21 is used in common for all the cylinders in this embodiment, an air-fuel ratio sensor may be disposed in each of the branch pipes of the exhaust manifold 19 for the cylinders, for example, and the air-fuel ratio sensors for each of the cylinders may be used to determine whether or not the actual mechanical compression ratios in corresponding cylinders are uniform. In this case, the air-fuel ratio sensors preferably have the same relationship between the mechanical compression ratio and the deviation of the output air-fuel ratio (FIG. 10). However, even if the relationship between the mechanical compression ratio and the deviation of the output air-fuel ratio is different in the air-fuel ratio sensors, the same concept as above can be applied when the precise relationship between the mechanical compression ratio and the deviation of the output air-fuel ratio in each air-fuel ratio sensor is known.

What is claimed is:

1. A control device for a multi-cylinder internal combustion engine that is equipped with a variable compression ratio mechanism, comprising:
    an air-fuel ratio sensor that is disposed in an engine exhaust system; and
    a controller that determines whether or not actual mechanical compression ratios in cylinders of the multi-cylinder internal combustion engine are uniform,
    wherein the air-fuel ratio sensor outputs an air-fuel ratio that is higher than an actual air-fuel ratio when vaporized fuel is contained in exhaust gas,
    wherein a deviation between the output air-fuel ratio from the air-fuel ratio sensor and the actual air-fuel ratio is greater as a concentration of the vaporized fuel in the exhaust gas is higher, and
    wherein the controller controls the variable compression ratio mechanism by decreasing a target mechanical compression ratio from a current first target mechanical compression ratio to a second target mechanical compression ratio without changing an amount of intake air and a fuel injection amount when the controller determines whether or not the actual mechanical compression ratios in the cylinders are uniform, and determines that the actual mechanical compression ratios in the cylinders are not uniform when the target mechanical compression ratio is set at the first target mechanical compression ratio if differences in the output air-fuel ratios from the air-fuel ratio sensor for the exhaust gases from the cylinders before and after the control of the variable compression ratio mechanism are not uniform.

2. The control device according to claim 1,
    wherein, taking into account that the concentration of the vaporized fuel in the exhaust gas is higher as the actual mechanical compression ratio is higher, the deviation between the output air-fuel ratio from the air-fuel ratio sensor and the actual air-fuel ratio is set at a different value for each actual mechanical compression ratio,
    wherein the difference in the deviation of the output air-fuel ratio from the air-fuel ratio sensor before and after the mechanical compression ratio is decreased by a set amount varies depending on the mechanical compression ratio before the decrease,
    wherein the controller controls the variable compression ratio mechanism by decreasing the target mechanical compression ratio from the first target mechanical compression ratio to the second target mechanical compression ratio, which is smaller than the first target mechanical compression ratio by the set amount, when the controller determines whether or not the actual mechanical compression ratios in the cylinders are uniform,
    wherein the controller estimates the actual mechanical compression ratio in each of the cylinders at a time when the target mechanical compression ratio is set at the first target mechanical compression ratio, based on the difference in the output air-fuel ratio from the air-fuel ratio sensor for the exhaust gas from the cylinder before and after the control of the variable compression ratio mechanism, and
    wherein, when it is determined that the estimated actual mechanical compression ratios in the cylinders are not uniform, the controller corrects the output air-fuel ratio from the air-fuel ratio sensor for the exhaust gas from the cylinder, in which the estimated actual mechanical compression ratio is different from the first target mechanical compression ratio, at the time when the target mechanical compression ratio is set at the first target mechanical compression ratio, by subtracting the deviation at the actual mechanical compression ratio and adding the deviation at the first target mechanical compression ratio.

3. The control device according to claim 2,
    wherein the first target mechanical compression ratio is equal to a maximum mechanical compression ratio, and
    wherein the controller determines that the air-fuel ratio sensor is in an abnormal condition if the difference in the deviation corresponding to at least one cylinder is greater than the difference in the deviation corresponding to the maximum mechanical compression ratio when the variable compression ratio mechanism is controlled by decreasing the target mechanical compression ratio to the second target mechanical compression ratio which is smaller than the first target mechanical compression ratio by the set amount and the difference in the deviation corresponding to each of the cylinders is calculated by calculating the difference in the output air-fuel ratio from the air-fuel ratio sensor for the exhaust gas from the cylinder before and after the control of the variable compression ratio mechanism.

* * * * *